United States Patent
Sano et al.

(10) Patent No.: US 9,231,445 B2
(45) Date of Patent: Jan. 5, 2016

(54) ROTOR FOR THE ELECTRIC MACHINE

(75) Inventors: Shinya Sano, Toyota (JP); Ken Takeda, Anjo (JP); Tomohiro Inagaki, Nishio (JP); Shinichi Otake, Aichi-ken (JP); Tsuyoshi Miyaji, Toyohashi (JP); Yuta Watanabe, Nishio (JP); Ryosuke Utaka, Takahama (JP)

(73) Assignees: TOYOTA JIDOSHA KABUSHIKI KAISHA, Aichi-ken (JP); AISIN AW CO., LTD., Aichi-ken (JP); DENSO CORPORATION, Aichi (JP)

( * ) Notice: Subject to any disclaimer, the term of this patent is extended or adjusted under 35 U.S.C. 154(b) by 242 days.

(21) Appl. No.: 13/982,629

(22) PCT Filed: Feb. 2, 2012

(86) PCT No.: PCT/IB2012/000170
§ 371 (c)(1),
(2), (4) Date: Jul. 30, 2013

(87) PCT Pub. No.: WO2012/104715
PCT Pub. Date: Aug. 9, 2012

(65) Prior Publication Data
US 2013/0307363 A1 Nov. 21, 2013

(30) Foreign Application Priority Data
Feb. 3, 2011 (JP) ................................. 2011-021411

(51) Int. Cl.
*H02K 1/27* (2006.01)
(52) U.S. Cl.
CPC ................ *H02K 1/27* (2013.01); *H02K 1/2766* (2013.01)
(58) Field of Classification Search
CPC ............................... H02K 1/2766; H02K 1/27
USPC .......................... 310/156.56, 156.57, 156.01
See application file for complete search history.

(56) References Cited

U.S. PATENT DOCUMENTS

| 6,555,940 B2 * | 4/2003 | Naito et al. ............... 310/156.56 |
| 2002/0175584 A1 * | 11/2002 | Koharagi et al. ......... 310/156.56 |

(Continued)

FOREIGN PATENT DOCUMENTS

| EP | 0 889 574 A1 | 1/1999 |
| JP | 2006-311772 A | 11/2006 |

(Continued)

OTHER PUBLICATIONS

International Search Report and Written Opinion for corresponding International Patent Application No. PCT/IB2012/000170 mailed Jun. 18, 2012.

*Primary Examiner* — Alex W Mok
(74) *Attorney, Agent, or Firm* — Sughrue Mion, PLLC

(57) ABSTRACT

A rotor (10) for a rotary electric machine has a plurality of magnetic poles (24) provided at intervals, in a circumferential direction, at the outer periphery of a rotor core (12). Each of the magnetic poles (24) has a first permanent magnet (26) buried in the center of the magnetic pole, and a pair of second permanent magnets (28) that are buried on both sides of the first permanent magnet (26) in the circumferential direction, and that are disposed such that a mutual spacing between the pair of the second permanent magnets (28) becomes narrower inward in the radial direction. A narrowest spacing between the pair of second permanent magnets (28) is set to be wider than a longitudinal-direction width of the first permanent magnet (26) in a magnetic path region (30) that is defined by the first permanent magnet (26) and the pair of second permanent magnets (28).

11 Claims, 7 Drawing Sheets

(56) References Cited

U.S. PATENT DOCUMENTS

| | | |
|---|---|---|
| 2006/0290221 A1 | 12/2006 | Hsu |
| 2007/0096579 A1 | 5/2007 | Aydin et al. |
| 2012/0187877 A1* | 7/2012 | Yamagiwa et al. ...... 318/400.02 |
| 2012/0200185 A1 | 8/2012 | Sano et al. |
| 2012/0200186 A1 | 8/2012 | Sano et al. |
| 2012/0200187 A1 | 8/2012 | Sano et al. |
| 2012/0200188 A1 | 8/2012 | Sano et al. |
| 2012/0200193 A1 | 8/2012 | Sano et al. |

FOREIGN PATENT DOCUMENTS

| | | |
|---|---|---|
| JP | 2006-314152 A | 11/2006 |
| JP | 2007-274798 A | 10/2007 |
| JP | 2008-306849 A | 12/2008 |
| JP | 2012-161226 A | 8/2012 |
| JP | 2012-161228 A | 8/2012 |
| JP | 2012-165480 A | 8/2012 |
| JP | 2012-165481 A | 8/2012 |
| JP | 2012-165482 A | 8/2012 |
| WO | 2012/008295 A1 | 1/2012 |

* cited by examiner

ROTOR FOR THE ELECTRIC MACHINE

BACKGROUND OF THE INVENTION

1. Field of the Invention

The invention relates to a rotor for a rotary electric machine, and more particularly to a rotor for a rotary electric machine in which a plurality of magnetic poles are disposed at intervals, in a circumferential direction, at an outer periphery of a rotor core.

2. Description of Related Art

For example, Japanese Patent Application Publication No. 2008-306849 (JP-A-2008-306849) discloses a rotary electric machine that has a stator in which a stator coil is distributedly wound around an inner periphery portion, and a buried permanent magnet-type rotor that is rotatably provided in the stator. The above rotor is made up of a rotary shaft and a cylindrical core body that is fixed to the rotary shaft.

The above core body results from integrally constructing, by crimping or the like, an axial-direction stack of magnetic steel sheets, each formed through punching, into a circular ring-like shape. A plurality of magnetic poles, evenly spaced in a circumferential direction, are provided in the outer periphery of the core body. FIG. 8 illustrates one magnetic pole in a state viewed from an axial-direction end face. FIG. 8 illustrates one magnetic pole 104, together with part of a stator 106, from among the members that are disposed evenly spaced (45°-angle intervals such that the central axis of a rotary shaft is the center of each fan shape) on the outer periphery of the core body 102 of the rotor 100.

A plurality of teeth 108 that point inward in a radial direction are provided, at equal spacings in the circumferential direction, on the inner periphery of the stator 106. Slots 108 are respectively formed, in a number identical to that of the teeth 106, between mutually adjacent teeth, such that the slots 108 are opened on the inner periphery side and at both end portions in the axial direction. A stator coil (not shown) that is wound around the teeth 106 is inserted into the slots 108. As a result, a rotating magnetic field is formed on the inner periphery side of the stator 100 when the stator coil is energized.

Each magnetic pole 104 provided in the core body 102 of the rotor 100 is made up of three permanent magnets, namely permanent magnets 112, 114, 116. The permanent magnet 112 disposed in the circumferential direction center of the magnetic pole 104 is buried in the vicinity of an outer peripheral face 103 of the core body 102. The permanent magnet 112 has end faces and a cross-section that exhibit an elongated rectangular shape, and is formed to substantially the same axial-direction length as that of the core body 102. The permanent magnet 112 is disposed in such a manner that the longitudinal direction thereof, on the magnet end face, runs substantially along the outer peripheral face 103 of the core body 102, and has a longitudinal-direction width W.

The other two permanent magnets 114, 116 are disposed symmetrically on both sides of the permanent magnet 112, in the circumferential direction, such that the two permanent magnets 114, 116 form a V-shape that widens towards the outer periphery. In other words, the permanent magnets 114, 116 are disposed in such a manner that the distance or mutual spacing becomes narrower towards the inner periphery, and the spacing between inner periphery-side end portions of the permanent magnets 114, 116, at which the mutual spacing is the narrowest, is narrower than the longitudinal-direction width W. In the magnetic pole 104, as a result, a substantially triangular magnetic path region 118 is formed or defined by the three permanent magnets 112, 114, 116. Both end portions of the magnetic path region 118, in the circumferential direction, are linked to the outer peripheral face 103 of the core body 102 via regions between the permanent magnet 112 and the permanent magnets 114, 116.

JP-A-2008-306849 indicates that in a rotary electric machine provided with a rotor 100 having the above configuration, it becomes possible to reduce counter electromotive force of a particular order that is generated upon operation of the rotary electric machine, and noise as well can be reduced, by setting, to a predefined angle, the intersection angle that is defined by virtual straight lines that join the circumferential-direction end portions of the permanent magnets 114, 116 and the center of the rotary shaft, and a virtual reference line that runs through the center of the rotary shaft and that is perpendicular to a radial-direction straight line that runs through the circumferential direction center of the permanent magnet 112.

In the rotary electric machine of JP-A-2008-306849, magnetic flux flow such as those illustrated in FIGS. 9A to 9C is formed at the magnetic pole 104 of the core body 102 of the rotor 100 upon rotational driving of the rotor 100 as a result of flow of current through the stator coil. FIG. 9A schematically illustrates the flow of magnetic flux (hereafter, magnet magnetic flux), generated by the permanent magnet 114, towards the outer periphery through a magnetic path region 118. FIG. 9B schematically illustrates the way in which magnetic flux, which is generated by a q-axis current component obtained by resolving the vector representing the electric current flowing through the stator coil, on a d-q plane that is a Cartesian coordinate system (hereafter, q-axis current magnetic flux or excitation current magnetic flux), flows from the inner periphery end portions of the teeth 108 of the stator 106 into the core body 102 and traverses the magnetic path region 118 in the magnetic pole 104. FIG. 9C schematically illustrates the flow of magnetic flux resulting from combining the abovementioned magnet magnetic flux and the abovementioned q-axis current magnetic flux.

With reference to FIG. 9A, the magnet magnetic flux generated by the permanent magnet 114 is directed towards the outer peripheral face 103 of the core body 102. Part of the magnetic flux coming out of the permanent magnet 114 is directed towards the outer peripheral face, through the permanent magnet 112. However, the permanent magnet 112 that is buried in the core body 102 has a magnetoresistance or relative permeability that is equivalent to that of a void, and hence most of the magnetic flux flows towards the outer peripheral face, through the circumferential-direction end portion region of the magnetic path region 118, which is a steel sheet portion having low magnetoresistance. With reference to FIG. 9B, the q-axis current magnetic flux that flows into the magnetic pole 104 in the core body 102 is likewise directed towards the outer peripheral face, by flowing substantially along a circular arc through the magnetic path region 118 having low magnetoresistance.

Consequently, upon overlap of the magnet magnetic flux and the q-axis current magnetic flux that flow as described above, the density of the resultant magnetic flux increases at a substantially triangular downstream region 120, denoted by a hatched portion within the magnetic path region 118, as illustrated in FIG. 9C, and as a result, magnetic saturation is likelier to occur. In turn, this can result in a lower torque of the rotary electric machine.

In FIG. 9A, the magnetic flux generated by the permanent magnet 116 is not depicted. However, the magnetic flux from the permanent magnet 116 flows also towards the abovementioned downstream region 120, and hence there increases the possibility of magnetic saturation such as the above-described one. If the flow direction of the magnetic flux in the magnetic path region 118 is reversed, occurrence of magnetic saturation as described above is still likely at a region positioned between the permanent magnet 116 and the permanent magnet 112, within the magnetic path region 118.

SUMMARY OF THE INVENTION

The invention provides a rotor for a rotary electric machine, in which each of magnetic poles includes at least three permanent magnets, and with which it is possible to enhance the torque of the rotary electric machine.

A rotor for a rotary electric machine according to an aspect of the invention includes: a rotor core having a plurality of magnetic poles provided at intervals, in a circumferential direction of the rotor core, at an outer periphery of the rotor core, each of the magnetic poles having a first permanent magnet buried in the center of the magnetic pole, in the circumferential direction, and a pair of second permanent magnets that are buried on both sides of the first permanent magnet, in the circumferential direction, and that are disposed such that a mutual spacing between the pair of the second permanent magnets becomes narrower inward in a radial direction of the rotor core, wherein the narrowest spacing between the pair of second permanent magnets is set to be wider than a width of the first permanent magnet in a direction perpendicular to the radial direction in a magnetic path region that is formed by being surrounded by the first permanent magnet and the pair of second permanent magnets, as viewed along an axial direction of the rotor core.

In the rotor for a rotary electric machine according to the aspect of the invention, each of the first permanent magnet and the pair of second permanent magnets may have a flat shape, and the direction perpendicular to the radial direction may be a longitudinal direction of the first permanent magnet.

In the rotor for a rotary electric machine according to the aspect of the invention, a cross section, perpendicular to the axial direction of the rotor core, of each of the first permanent magnet and the pair of second permanent magnets, may have an elongated rectangular shape.

In the rotor for a rotary electric machine according to the aspect of the invention, each of magnetic poles may further have a magnetic flux suppression hole that is formed at a position opposite the first permanent-magnet, across the magnetic path region, between inner periphery-side end portions, in the radial direction, of the pair of second permanent magnets.

In the rotor for a rotary electric machine according to the aspect of the invention, the magnetic flux suppression hole may have two first holes that communicate with inner periphery-side end portions of second magnet insertion holes into which the pair of second permanent magnets is respectively inserted, and a second hole that is formed between the first holes with bridge portions interposed between the second hole and the first holes; and at least one of the first and second holes may include at least one of a void or a resin having lower relative permeability than that of a magnetic material that forms the rotor core.

In the rotor for a rotary electric machine according to the aspect of the invention, the first permanent magnet may have two permanent magnets that are disposed close to each other forming a substantially V-shape that widens towards an outer periphery in the radial direction.

In the rotor for a rotary electric machine according to the aspect of the invention, each of the magnets in the pair of second permanent magnets may have two permanent magnets disposed close to each other so as to form a substantially V-shape that widens towards the first permanent magnet.

In the rotor for a rotary electric machine according to the aspect of the invention, a longitudinal direction of each of the pair of second permanent magnets may be disposed substantially along the radial direction.

In the rotor for a rotary electric machine according to the aspect of the invention, a position of the first permanent magnet in the radial direction may be substantially identical to a position, in the radial direction, of outer periphery-side end portions of the pair of second permanent magnets in the radial direction.

In the rotor for a rotary electric machine according to the aspect of the invention, each of the magnetic poles has a first magnetic flux suppression hole that is formed at a position opposite the first permanent magnet across the magnetic path region, between inner periphery-side end portions, in the radial direction, of the pair of second permanent magnets, the first permanent magnet, the second permanent magnets and the first magnetic flux suppression hole defining the magnetic path region as a first magnetic path region; in each of the magnetic poles, a second magnetic path region is formed on an inner periphery side of the first magnetic path region with the first magnetic flux suppression hole interposed between the first magnetic path region and the second magnetic path region; each of the magnetic poles further has a pair of third permanent magnets buried on both sides of the pair of second permanent magnets in the circumferential direction, and disposed such that a mutual spacing between the pair of third permanent magnets becomes narrower inward in the radial direction, and a second magnetic flux suppression hole formed opposite the first magnetic flux suppression hole across the second magnetic path region, between inner periphery-side end portions in the radial direction, of the pair of third permanent magnets; the second magnetic path region is defined by the second and third permanent magnets as well as the first and second magnetic flux suppression holes, on an inner periphery side, in the radial direction, of the first magnetic path region; and in the second magnetic path region, the narrowest spacing between the pair of third permanent magnets is set to be equal to or greater than a width between edge portions, outward in the circumferential direction, of the pair of second permanent magnets, in a direction perpendicular to the radial direction.

In the rotor for a rotary electric machine according to the aspect of the invention, the first magnetic flux suppression hole may have two first holes that communicate with inner periphery-side end portions of second magnet insertion holes into which the pair of second permanent magnets is respectively inserted, and a second hole that is formed between the first holes with bridge portions interposed between the second hole and the first holes; and at least one of the first and second holes may include at least one of a void or a resin having lower relative permeability than that of a magnetic material that forms the rotor core.

In the rotor for a rotary electric machine according to the aspect of the invention, the second magnetic flux suppression hole may have two third holes that communicate with inner periphery-side end portions of third magnet insertion holes into which the pair of third permanent magnets is respectively inserted, and a fourth hole that is formed between the third holes with bridge portions interposed between the fourth hole and the third holes; and at least one of the third and fourth holes may include at least one of a void or a resin having lower relative permeability than that of a magnetic material that forms the rotor core.

In the rotor for a rotary electric machine according to the aspect of the invention, the first permanent magnet may have two permanent magnets that are disposed close to each other forming a substantially V-shape that widens towards an outer periphery in the radial direction.

In the rotor for a rotary electric machine according to the aspect of the invention, each of the pair of second permanent magnets may have two permanent magnets disposed close to each other so as to form a substantially V-shape that widens towards the first permanent magnet.

In the rotor for a rotary electric machine according to the aspect of the invention, each of the pair of third permanent magnets may have two permanent magnets disposed close to each other so as to form a substantially V-shape that widens towards the first permanent magnet.

In the rotor for a rotary electric machine according to the aspect of the invention, the pair of third permanent magnets may have a flat shape.

In the rotor for a rotary electric machine according to the aspect of the invention, a cross section, perpendicular to the axial direction of the rotor core, of each of the pair of third permanent magnets, may have an elongated rectangular shape.

In the rotor for a rotary electric machine according to the aspect of the invention, a longitudinal direction of each of the pair of third permanent magnets may be disposed substantially along the radial direction.

In the rotor for a rotary electric machine according to the aspect of the invention, a radial direction position of the first permanent magnet, a position, in the radial direction, of outer periphery-side end portions of the pair of second permanent magnets in the radial direction, and a position, in the radial direction, of outer periphery-side-end portions of the pair of third permanent magnets in the radial direction, may be substantially identical to one another.

The rotor for a rotary electric machine according to the invention allows securing a wide magnetic path region that is formed between the first permanent magnet and the second permanent magnets. This allows easing, as a result, magnetic saturation in the magnetic path region. In addition, flow of magnetic flux is suppressed by the magnetic flux suppression hole, which allows suppressing leaks of magnetic flux from the first permanent magnet towards the inner periphery of the magnetic pole, while the magnetic flux from the second permanent magnets is caused to flow effectively towards the outer peripheral face of the magnetic pole through the magnetic path region. The magnet magnetic flux in the magnetic pole can therefore be further increased. The rotor for a rotary electric machine according to the invention as described above allows enhancing the torque in a rotary electric machine that is equipped with the above-described rotor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are explained below with reference to accompanying drawings. In the explanation below, specific forms, materials, numerical values, directions and so forth are merely examples for facilitating comprehension of the invention, and can be appropriately modified depending on the intended application, purpose, specifications and the like.

Figure 1:
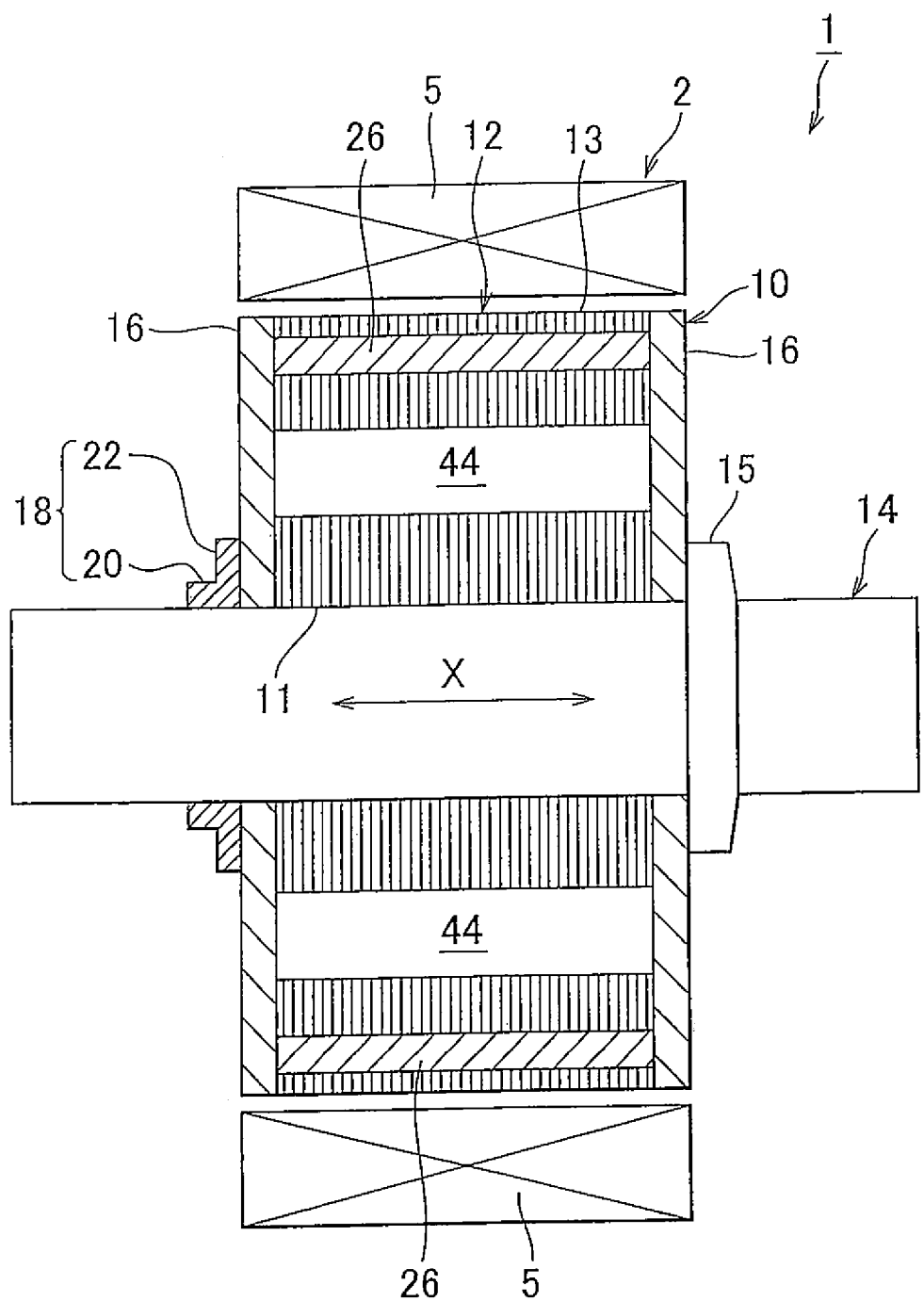
FIG. 1 is a longitudinal sectional diagram, taken along the axial direction, of a rotary electric machine provided with a rotor for a rotary electric machine (hereafter also simply referred to as rotor), which is one embodiment of the invention.
Figure 2:
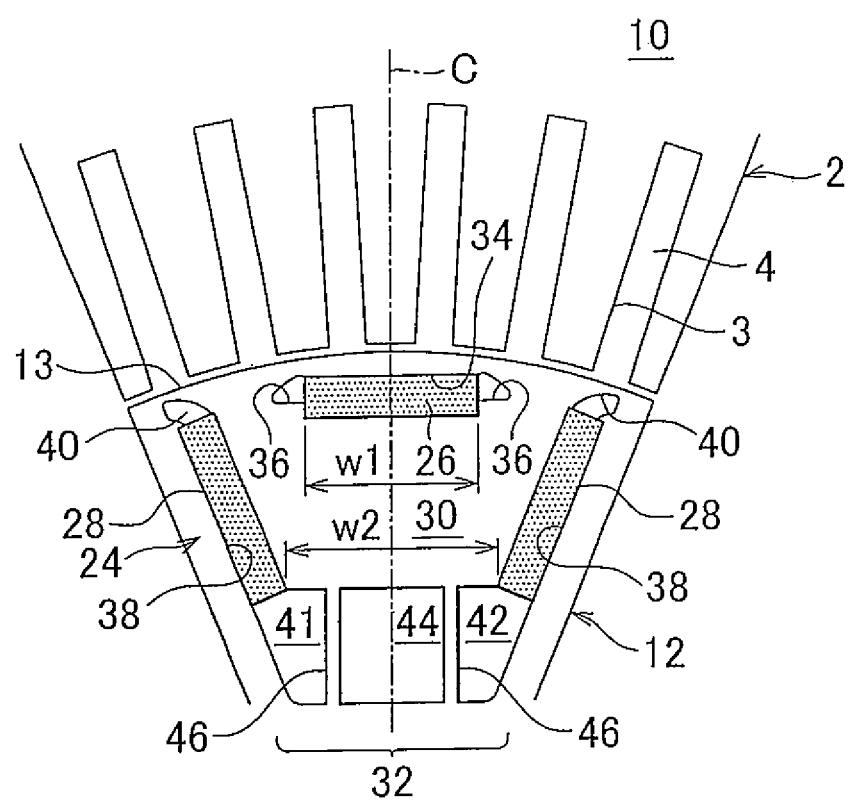
FIG. 2 is a partial enlarged view illustrating one magnetic pole of the rotor illustrated in FIG. 1, together with part of a stator.

FIG. 1 illustrates a longitudinal section along the axial direction of a rotary electric machine 1 provided with a rotor 10 of the embodiment. FIG. 2 illustrates an enlarged view of one magnetic pole of the rotor 10 together with part of a stator 2.

The rotary electric machine 1 has a tubular stator 2 and a rotor 10 that is rotatably provided inside the stator 2. A plurality of teeth 3 that point inward in a radial direction is provided, at equal spacings in the circumferential direction, on the inner periphery of the stator 2. Slots 4 are respectively formed, in a number identical to that of the teeth 3, between mutually adjacent teeth 3, such that the slots 4 are opened on the inner periphery side and at both ends in the axial direction. A stator coil 5 that is wound around the teeth 3 is inserted into the slots 4. As a result, a rotating magnetic field is formed on the inner periphery side of the stator 2 when the stator coil 5 is energized, so that the rotor 10 is rotationally driven by the rotating magnetic field.

The stator coil 5 that is wound around the teeth 3 may be a distributed-winding coil that is wound spanning a plurality of teeth 3, or may be a concentrated-winding coil that is wound around each of the teeth 3.

The rotor 10 includes: a cylindrical rotor core 12 having a shaft hole 11 in the center of a radial direction; a shaft 14 that is passed through the shaft hole 11 of the rotor core 12 and fixed; end plates 16 that are disposed in contact with the rotor core 12, on both ends of the latter, in the axial direction of the shaft 14 (and of the rotor core 12) denoted by arrow X; and a fixing member 18 that fixes the rotor core 12 and an end plate 16 to the shaft 14.

The rotor core 12 is configured through stacking, in the axial direction; of multiple magnetic steel sheets that are each formed through punching, into a circular ring-like shape, of, for example, 0.3 mm-thick silicon steel sheets or the like. The magnetic steel sheets that make up the rotor core 12 are integrally joined to each other by methods that involve crimping, bonding, welding or the like, of all sheets, collectively or by dividing the rotor core 12 into a plurality of blocks in the axial direction. A plurality of magnetic poles are provided, at equal spacings in the circumferential direction, on the rotor core 12. As explained in detail below, each magnetic pole has a plurality of permanent magnets and a magnetic flux suppression hole.

The shaft 14 is formed from a round steel bar. A flange section 15 is formed on the outer periphery of the shaft 14, such that the flange section 15 projects outwards in the radial direction. The flange section functions as a stopper that determines the axial direction position of the rotor core 12 on the shaft 14, through abutment against the end plate 16 during assembly of the rotor 10. The rotor core 12 is fixed to the shaft 14 by interference fitting. Alternatively, the circumferential direction position of the rotor core 12 is fixed with respect to the shaft 14 through fitting of a key, protrusively provided at an edge portion of the shaft hole 11, into a keyway in the shaft 14.

Each end plate 16 is made up of a disc having substantially the same outer shape as that of the axial-direction end faces of the rotor core 12. More preferably, the end plates 16 are made of a non-magnetic metal material, for example aluminum, copper or the like. A non-magnetic metal material is used herein for the purpose of suppressing the short circuit of magnetic flux at the axial-direction end portions of the permanent magnets that make up the magnetic poles. Provided that the material thereof is a non-magnetic material, the end plates 16 are not limited to a metal material, and may be formed out of a resin material.

The end plates 16 provided on both ends of the rotor core 12 in the axial direction have, for example, a function of pressing the rotor core 12 from both ends, a function of correcting unbalance in the rotor 10 arising from partial cutting work after assembly of the rotor 10, and a function of preventing that the permanent magnets that make up the magnetic poles should come off the rotor core 12 in the axial direction.

In the embodiment the end plates 16 are explained and depicted in the figures as having substantially the same diameter as the rotor core 12. However, the diameter of the end plates 16 may be for example made smaller, or the end plates 16 may be omitted, to cut costs, in a case where, for example, the permanent magnets that make up the magnetic poles are fixed in the interior of the rotor core by means of a resin or the like.

The fixing member 18 has a crimp portion 20 of cylindrical shape, and a pressing portion 22 that protrudes outwards in the radial direction from one end portion of the crimp portion 20. The fixing member 18 is fixed to a shaft 14 through crimping of the crimp portion 20 against the shaft 14, in a state where the rotor core 12 and the two end plates 16 are pressed against the flange portion 15 by the pressing portion 22. As a result, the rotor core 12 becomes fixed, together with the end plates 16, to the shaft 14.

Next, a configuration of the magnetic pole 24 of the rotor core 12 will be explained with reference to FIG. 2. FIG. 2 is a diagram illustrating one magnetic pole 24 in a state viewed from the axial-direction end face of the rotor core 12, but the configuration of cross sections that are perpendicular to the axial direction of the rotor core 12 is identical to that in the figure. The stator coil is not depicted in FIG. 2. In FIG. 2, the circumferential direction centerline of the magnetic pole 24 is denoted by a dashed line C.

A plurality of magnetic poles 24 are provided, equally spaced in the circumferential direction, on the outer periphery of the rotor core 12. In the embodiment an example is illustrated in which eight magnetic poles 24 are provided on the rotor core 12. The magnetic poles 24 are provided in such a manner that respective centers of the magnetic poles are positioned every 45° in the circumferential direction, around the center that is the rotation axis position of the shaft 14. The magnetic poles 24 are similarly configured, and hence the configuration of one magnetic pole will be explained below.

Each magnetic pole 24 has a first permanent magnet 26 buried in the center of the magnetic pole in the circumferential direction; a pair of second permanent magnets 28, buried on both sides of the first permanent magnet 26, in the circumferential direction, and disposed in such a manner that the mutual spacing becomes narrower inward in the radial direction or towards the inner periphery; and a magnetic flux suppression hole 32 that is formed between inner-periphery-side end portions of the pair of second permanent magnets 28, at a position opposite the first permanent magnet 26, across the magnetic path region 30.

The first permanent magnet 26 is buried in the interior of the rotor core 12, in the vicinity of an outer peripheral face 13. The first permanent magnet 26 has axial-direction end faces (and a cross-section perpendicular to the axial direction) of elongated rectangular shape, having two short sides and two long sides and being formed so as to have an axial-direction length substantially identical to that of the rotor core 12. The permanent magnet 26 is disposed at a position line-symmetrical with respect to the magnetic pole center line C so that the long-side lateral faces are perpendicular to the magnetic pole center line C. Herein, the first permanent magnet 26 has a longitudinal-direction width (i.e. long-side lateral face length) W1 as viewed from the axial-direction end faces.

The first permanent magnet 26 is inserted into a magnet insertion hole 34 that is formed, extending in the axial direction, in the rotor core 12. Pocket portions 36 are formed on both sides, in the circumferential direction, of the magnet insertion hole 34, such that the pocket portions 36 communicate with the magnet insertion hole 34. For example, a thermosetting resin that is injected via the pocket portions 36 flows into the gap between the first permanent magnet 26 and the inner wall face of the magnet insertion hole 34 and is cured, thereby fixing the first permanent magnet 26 in the magnet insertion hole 34.

The resin for fixing magnet may be injected through either of the pocket portions 36, and the other of the pocket portions 36 may be left void. In any case, the pocket portions 36 have, in the interior thereof, a resin or a void that has lower relative permeability than that of the magnetic steel sheets that make up the rotor core 12. Therefore, the pocket portions 36 have the function of suppressing the short circuit of magnetic flux at both ends of the first permanent magnet 26 in the circumferential direction.

Similarly to the first permanent magnet 26, each second permanent magnet 28 also has axial-direction end faces (and a cross-section perpendicular to the axial direction) of elongated rectangular shape, having two short sides and two long sides and being formed so as to have an axial-direction length substantially identical to that of the rotor core 12. The second permanent magnets 28 that have the same shape and size as those of the first permanent magnet 26 may be used. Using the same permanent magnets in the first and second permanent magnets 26, 28 is advantageous in that doing so allows reducing costs incurred in the manufacture, control and so forth of the permanent magnets. Needless to say, the shapes or sizes of the first permanent magnet 26 and the second permanent magnets 28 may be dissimilar.

The pair of second permanent magnets 28 in the magnetic poles 24 are inserted into magnet insertion holes 38 that are formed, extending in the axial direction, inside the rotor core 12, and are fixed with a resin. The pair of second permanent magnets 28 are therefore disposed in such a manner that a mutual spacing widens towards the outer peripheral face 13 of the rotor core 12. In other words, the pair of second permanent magnets 28 are disposed in such a manner that a mutual spacing becomes narrower towards the inner periphery, as described above. The long-side lateral faces, which constitute a longitudinal direction of the second permanent magnets 28, are disposed along substantially the radial direction. The pair of second permanent magnets 28 are disposed, according to a line-symmetrical relationship, on both sides of the magnetic pole center line C in the circumferential direction. A spacing W2 between the inner periphery-side end portions of the pair of second permanent magnets 28 (i.e. the distance in a direction perpendicular to the magnetic pole center line C) is set to be wider than the above-mentioned longitudinal-direction width W1 of the first permanent magnet 26. In other words, the second permanent magnets 28 are disposed so as to be positioned further outward than the first permanent magnet 26 with respect to the magnetic pole center line C. In the embodiment, more specifically, the inner periphery-side end portions of the second permanent magnets 28 are positioned outward, in the circumferential direction, of tangent lines that touch the circumferential-direction end portions of the first permanent magnet 26 and that are parallel to the magnetic pole center line C. That is, the distance from the magnetic pole center line C to each inner periphery-side end portion of the second permanent magnets 28 (i.e., ½ of W2) is set to be equal to or greater than the distance from the magnetic pole center line C to each longitudinal-direction end portion of the first permanent magnet 26 (i.e. ½ of W1).

A pocket portion 40 that communicates with each magnet insertion hole 38 is formed at the outer periphery side of each magnet insertion hole 38. Each pocket portion 40 is formed extending in the axial direction along the short-side lateral face of each second permanent magnet 28. Each pocket portion 40 has, in the interior thereof, a void or resin having lower relative permeability than that of the magnetic steel sheets. Therefore, the pocket portions 40 have the function of suppressing the short circuit of magnetic flux at the outer-periphery-side end portions of the second permanent magnets 28. The resin for fixing the second permanent magnets 28 may be injected via the pocket portions 40.

The magnetic flux suppression hole 32 is formed at a position (bottom in FIG. 2) close to the inner periphery, between inner periphery end portions of the pair of second permanent magnets 28. The magnetic flux suppression hole 32 is disposed opposite the first permanent magnet 26 across the magnetic path region 30. The magnetic flux suppression hole 32 has, in the interior thereof, a void of lower relative permeability than that of the magnetic steel sheets. Therefore, the magnetic flux suppression hole 32 has the function of suppressing or modifying the flow of magnetic flux generated by the permanent magnets 26, 28 and the flow of magnetic flux that flows from the leading ends at the inner periphery of the teeth 3 of the stator 2 and that penetrates into the magnetic path region 30 of the magnetic pole 24 of the rotor core 12.

In the embodiment, the magnetic flux suppression hole 32 is made up of two first holes 41, 42 and one second hole 44. The first holes 41, 42 are formed communicating with the inner-periphery-side end portions of the magnet insertion holes 38 through which the second permanent magnets 28 are inserted. The first holes 41, 42 are formed so as to have a substantially triangular shape, at symmetrical positions on both sides of the magnetic pole center line C. The first holes 41, 42 have the function of suppressing the short circuit of magnetic flux at long-side direction end portions on the inner periphery side of the second permanent magnets 28. The resin for fixing the second permanent magnets 28 may be injected into the magnet insertion holes 38, via the first holes 41, 42. In this case, the first holes may also be filled partly with the abovementioned resin. Similarly to voids, the resin has low relative, permeability, and hence the resin can fulfill the function of suppressing flow of magnetic flux, as described above.

The second hole 44 is formed between the first holes 41, 42, with bridge portions 46, which are stacked steel sheet portions, interposed between the second hole 44 and the first holes 41, 42. The second hole 44 is formed so as to have a substantially rectangular shape that is symmetrical with respect to a center that is traversed by the magnetic pole center line C. The second hole 44 is positioned opposite the outer peripheral face 13 of the rotor core 12 across the magnetic path region 30, at a central position, in the circumferential direction, between the pair of second permanent magnets 28. The second hole 44 as well has, in the interior thereof, a void (or resin) having lower relative permeability than that of magnetic steel sheets. Therefore, the second hole 44 has the function of suppressing flow of magnetic flux, as described above.

In the embodiment, an example is explained wherein the magnetic flux suppression hole 32 is made up of three holes 41, 42, 44, but the magnetic flux suppression hole 32 is not limited thereto, and the shape and number of holes may be varied. For example, the magnetic flux suppression hole 32 may be made up of two holes formed on both sides of one bridge portion extending along the magnetic pole center line C, or may be formed out of one hole, with no bridge portion, or may be formed out of four or more holes. The entire magnetic flux suppression hole 32 may be filled with a material having low relative permeability, for example a resin or the like.

In the magnetic pole 24, a stacked steel sheet portion surrounded by the first permanent magnet 26, the second permanent magnets 28 and the magnetic flux suppression hole 32 is formed as the magnetic path region 30. In the embodiment, the spacing W2 between the inner periphery-side end portions of the second permanent magnets 28 is set to be wider than the longitudinal-direction width W1 of the first permanent magnet 26; as a result, the magnetic path region 30 that is surrounded by the first permanent magnet 26 and the pair of second permanent magnets 28 has a substantially trapezoidal shape. In consequence, the core regions between the first permanent magnet 26 and the second permanent magnets 28 are wider than the magnetic path region of a conventional magnetic pole of three-permanent magnet type, in which the inner periphery-side end portions of the second permanent magnets 28 are disposed close to each other forming a V-shape. The magnetic path region 30 having a substantially trapezoidal shape extends towards the outer periphery, on both end sides in the circumferential direction, and links with the outer peripheral face 13 of the rotor core 12.

An explanation follows next on the flow of magnetic flux in the magnetic pole 24 of the rotor 10 having the above-described configuration. Magnetic flux flow such as those illustrated in FIGS. 3A to 3C is formed at a magnetic pole 24 of the rotor 10 upon rotational driving of the rotor 100 as a result of flow of current through the stator coil 5 of the stator 2.

Figures 3A, 3B:
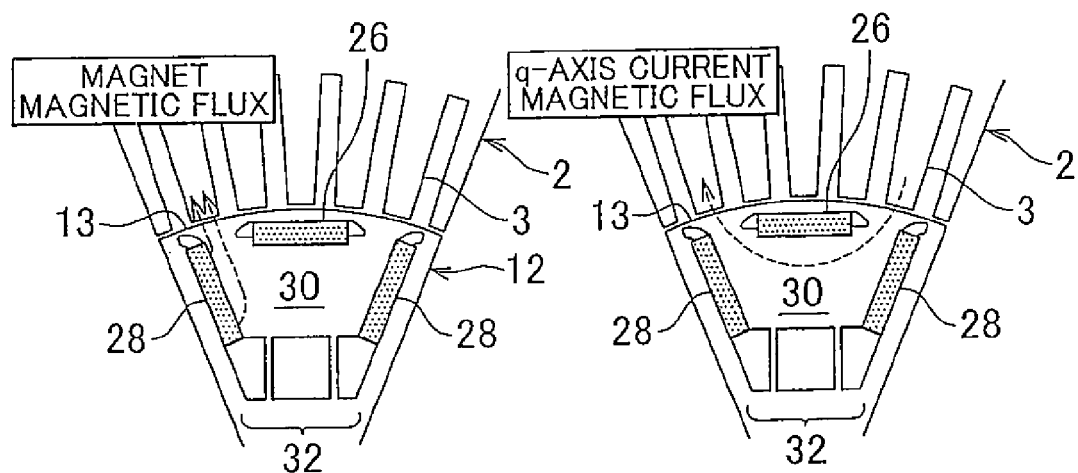
FIGS. 3A to 3C are diagrams schematically illustrating the flow of magnetic flux in a magnetic pole illustrated in FIG. 2, wherein FIG. 3A schematically illustrates the flow of magnet magnetic flux generated by one of the second permanent magnets towards the outer periphery through a magnetic path region, FIG. 3B schematically illustrates excitation current magnetic flux that flows from a stator into a rotor, through a magnetic path region in a magnetic pole, and FIG. 3C schematically illustrates flow of magnetic flux resulting from combining a magnet magnetic flux and excitation current magnetic flux.
Figure 3C:
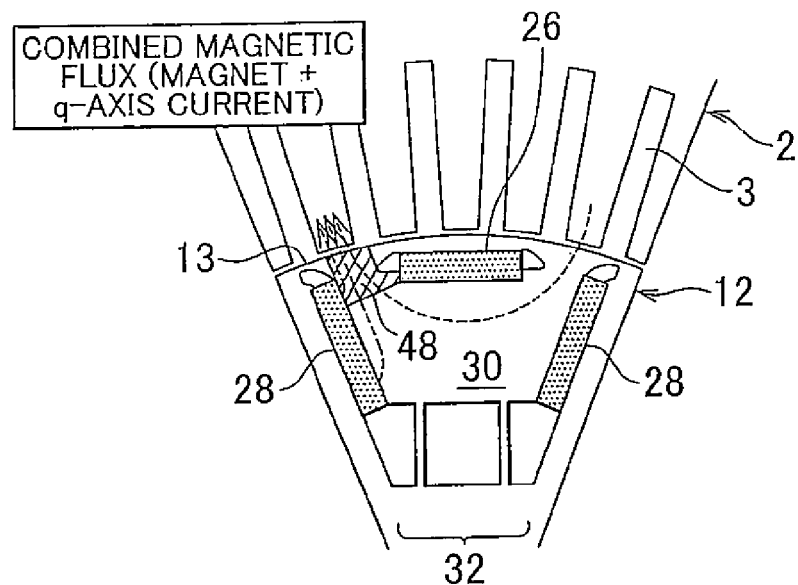

FIG. 3A schematically illustrates the flow of the magnet magnetic flux generated by one of the second permanent magnets 28 towards the outer periphery through the magnetic path region 30. FIG. 3B schematically illustrates the way in which magnetic flux, which is generated by a q-axis current component obtained by resolving the vector representing the electric current flowing through the stator coil on a d-q plane that is a Cartesian coordinate system, flows from the inner periphery end portions of the teeth 3 of the stator 2 into the rotor core 12 and traverses the magnetic path region 30 in the magnetic pole 24. FIG. 3C schematically illustrates the flow of magnetic flux resulting from combining the abovementioned magnet magnetic flux and the abovementioned q-axis current magnetic flux.

Figure 9A:
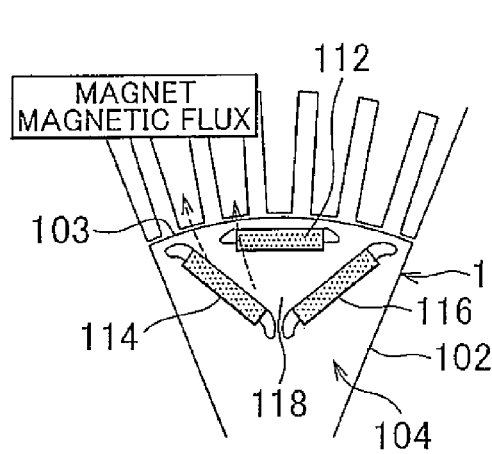
FIGS. 9A to 9C are diagrams schematically illustrating the flow of magnetic flux in a magnetic pole illustrated in FIG. 8, wherein FIG. 9A schematically illustrates the flow of magnet magnetic flux generated by one of the permanent magnets, disposed forming substantially a V-shape, towards the outer periphery through a magnetic path region, FIG. 9B schematically illustrates excitation current magnetic flux that flows from a stator into a rotor, through a magnetic path region in a magnetic pole, and FIG. 9C schematically illustrates flow of magnetic flux resulting from combining a magnet magnetic flux and excitation current magnetic flux.
Figure 9B:
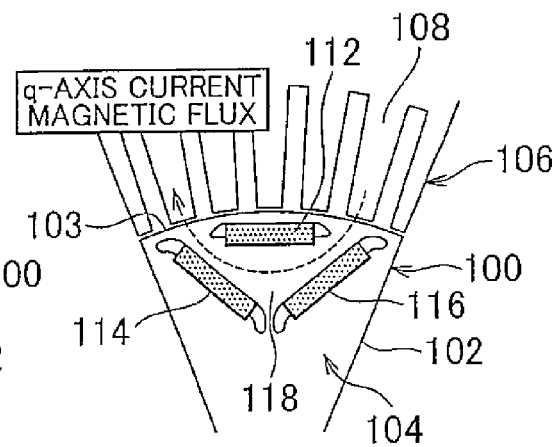
Figure 9C:
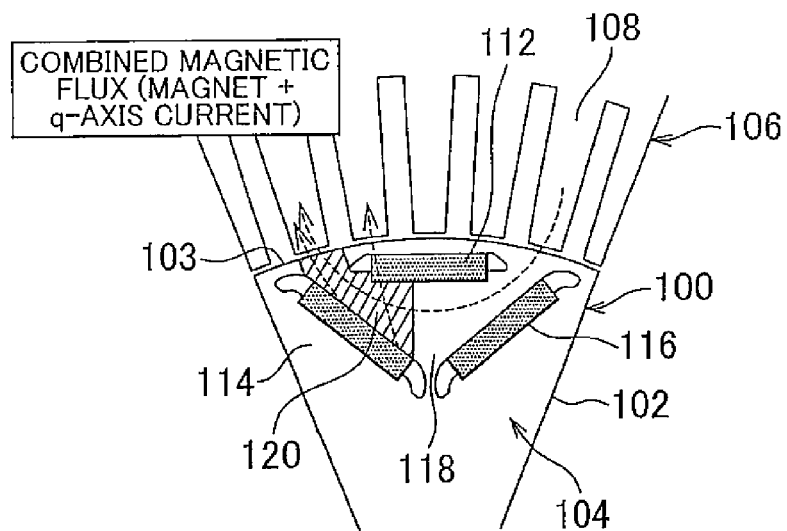

With reference to FIG. 3A, the magnet magnetic flux generated by one of the second permanent magnets 28 is directed towards the outer peripheral face 13 of the rotor core 12, through the magnetic path region 30. With reference to FIG. 3B, the q-axis current magnetic flux that flows into the magnetic pole 24 in the rotor core 12 is likewise directed towards the outer peripheral face 13, by flowing substantially along a circular arc, through the magnetic path region 30 having low magnetoresistance. Upon overlap of the magnet magnetic flux and the q-axis current magnetic flux that flow as described above, the density of the combined magnetic flux increases comparatively at a downstream region or exit region 48, denoted by a hatched portion within the magnetic path region 30 that is formed in a substantially trapezoidal shape, as illustrated in FIG. 3C. However, a comparison with the hatched region 120 in FIG. 9C shows that the region in which the occurrence of magnetic saturation is feared is now significantly smaller. As a result, reluctance torque increases as well through an increase in q-axis inductance Lq, upon an increase in magnet torque through an increase in the magnet magnetic flux in the magnetic pole 24. This allows effectively enhancing the total torque, being the sum of magnet torque and reluctance torque, in the rotary electric machine 1 that uses the rotor 10.

In the rotor 10 of the embodiment, the magnetic flux suppression hole 32 provided at the inner periphery side of each magnetic pole 24 suppresses the flow of magnetic flux. Therefore, it is possible to prevent the magnetic flux from the first permanent magnet 26 from leaking towards the inner periphery of the magnetic pole 24, and the magnetic flux from the second permanent magnets 28 is caused to flow effectively towards the outer peripheral face 13 of the magnetic pole 24 through the magnetic path region 30. As a result, the magnet magnetic flux in the magnetic pole 24 increases, which leads to increase in magnet torque, and it is possible to reduce the d-axis inductance Ld. Thus, it becomes possible to enhance yet more effectively magnet torque and reluctance torque in the rotary electric machine 1 that uses the rotor 10.

In the rotor 10 of the embodiment, thus, the counter electromotive force generated in the stator coil 5 is made to have a substantially sinusoidal waveform, and iron loss on account of a harmonic components of a particular order, in the counter electromotive force, by distributedly arranging, as described above, the first permanent magnet 26 at the center of the magnetic pole 24, and the pair of second permanent magnets 28 on both sides of the first permanent magnet 26, in the circumferential direction.

A preferred embodiment has been explained above in which the magnetic flux suppression hole 32 is provided at an inner periphery side position of the first permanent magnet 26, but such a magnetic flux suppression hole is not an essential constituent of the invention, and may be omitted.

Variations of the rotor 10 of the above embodiment are explained next with reference to FIGS. 4 to 7.

Figure 4:
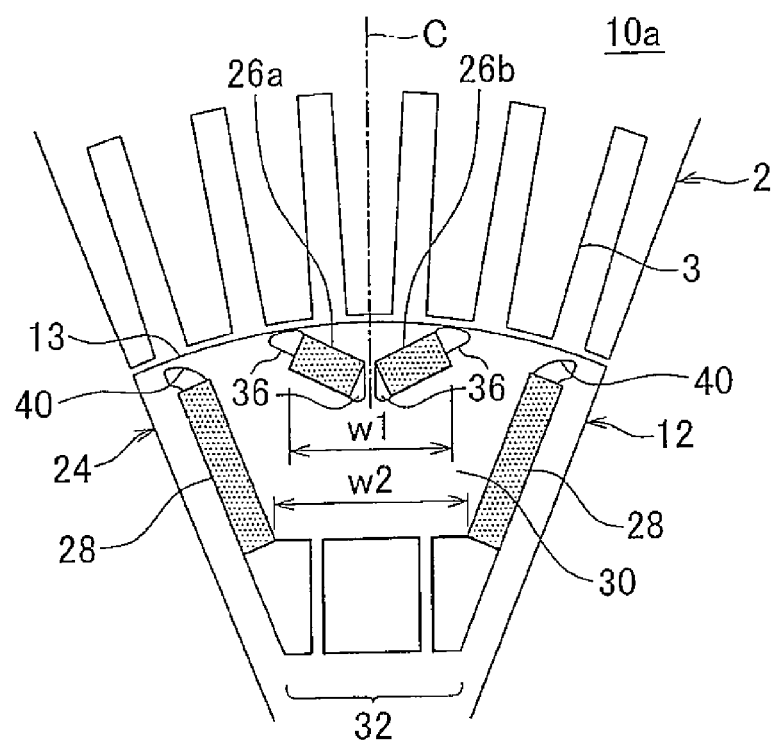
FIG. 4 is a diagram, similar to FIG. 2, illustrating an example in which a first permanent magnet at a center of a magnetic pole is split into a plurality of permanent magnets.

FIG. 4 illustrates an example in which the first permanent magnet 26 is split into a plurality of permanent magnets at the center of the magnetic pole 24. In this example, two split first permanent magnets 26a, 26b are disposed at symmetrical positions across the magnetic pole center line C, the first permanent magnets 26a, 26b being close to each other and forming a substantially V-shape that widens towards the outer periphery. Respective pocket portions 36, for suppressing the short circuit of magnetic flux, are provided between the two first permanent magnets 26a, 26b. In this case, the distance between the outer periphery corners of the two first permanent magnets 26a, 26b corresponds to the longitudinal-direction width W1 of the first permanent magnet. The two magnetic flux suppression holes 36 between the first permanent magnets 26a, 26b may communicate with each other to form one single hole. Other features are identical to those of the rotor 10 described above, and hence identical and similar constituent elements are denoted with identical or similar reference numerals, and an explanation thereof is omitted.

Figure 5:
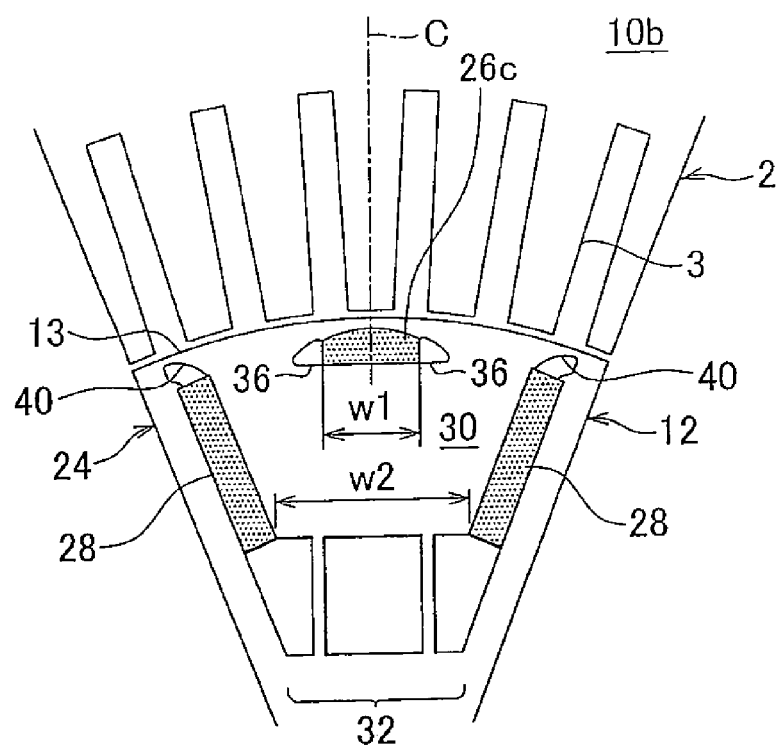
FIG. 5 is a diagram, similar to FIG. 2, illustrating an example in which an outer periphery side face of a first permanent magnet, at a center of a magnetic pole, is a curved surface.

FIG. 5 illustrates an example in which an outer periphery side face of a first permanent magnet 26c, at the center of the magnetic pole 24, is a curved surface having a substantially circular arc shape. Thus, the end face shape of the first permanent magnet need not be rectangular. The same is true of the second permanent magnets. Other features are identical to those of the above-described rotor 10.

Figure 6:
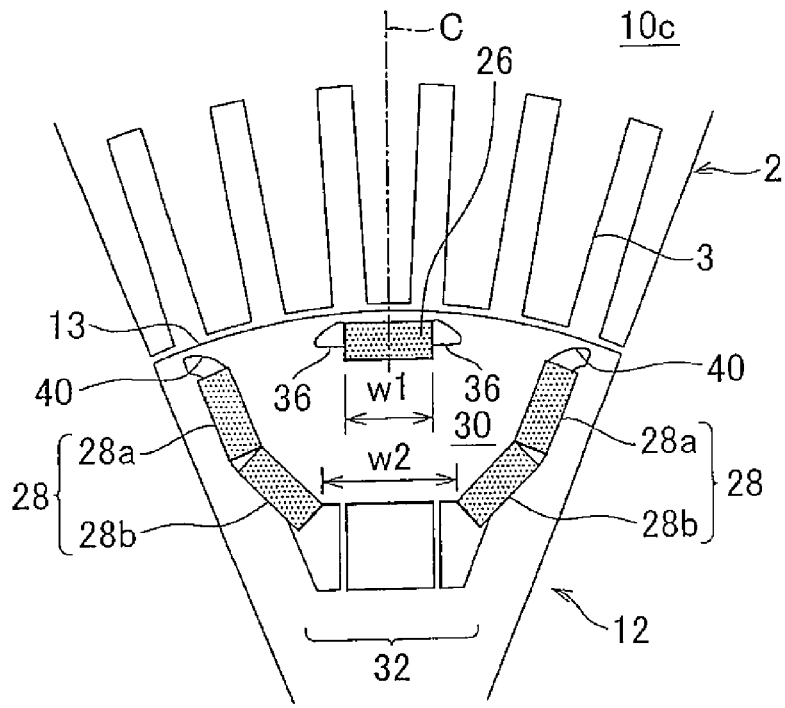
FIG. 6 is a diagram, similar to FIG. 2, illustrating an example in which a pair of second permanent magnets are disposed in the form of substantially a V-shape open toward a first permanent magnet.

FIG. 6 illustrates an example in which a pair of second permanent magnets are disposed in the form of a substantially V-shape open toward the first permanent magnet 26. In this example, each magnet in the pair of second permanent magnets 28 is made up of two permanent magnets 28a, 28b disposed close to each other so as to form a substantially V-shape that widens towards the first permanent magnet 26. In this case the narrowest spacing between the pair of second permanent magnets 28 corresponds to the distance between inner periphery side corners of the two second permanent magnets 28b, 28b that are respectively disposed on the inner periphery side. Other features are identical to those of the above-described rotor 10.

Figure 7:
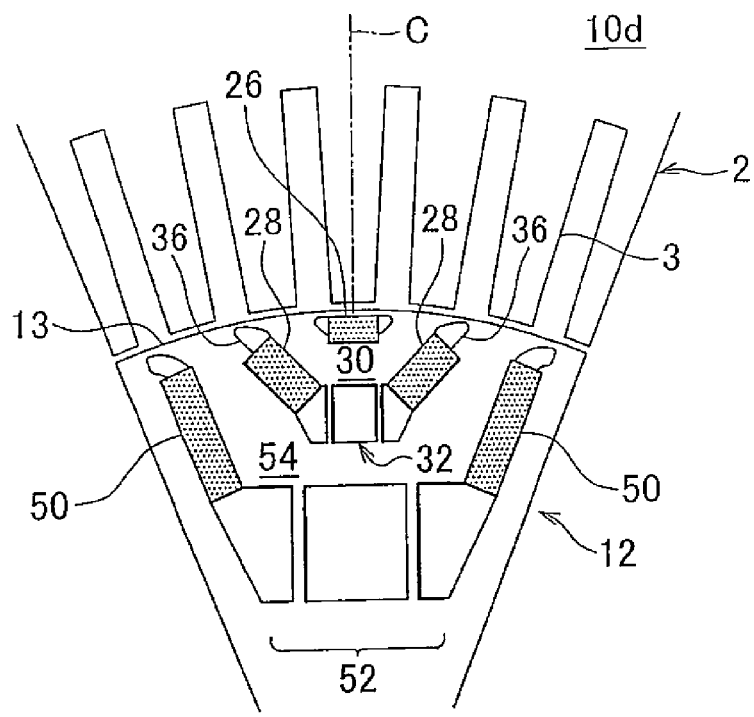
FIG. 7 is a diagram, similar to FIG. 2, illustrating an example in which a second magnetic path region is formed, at an inner periphery side of a first magnetic path region, by a pair of third permanent magnets and a second magnetic flux suppression hole.
Figure 8:
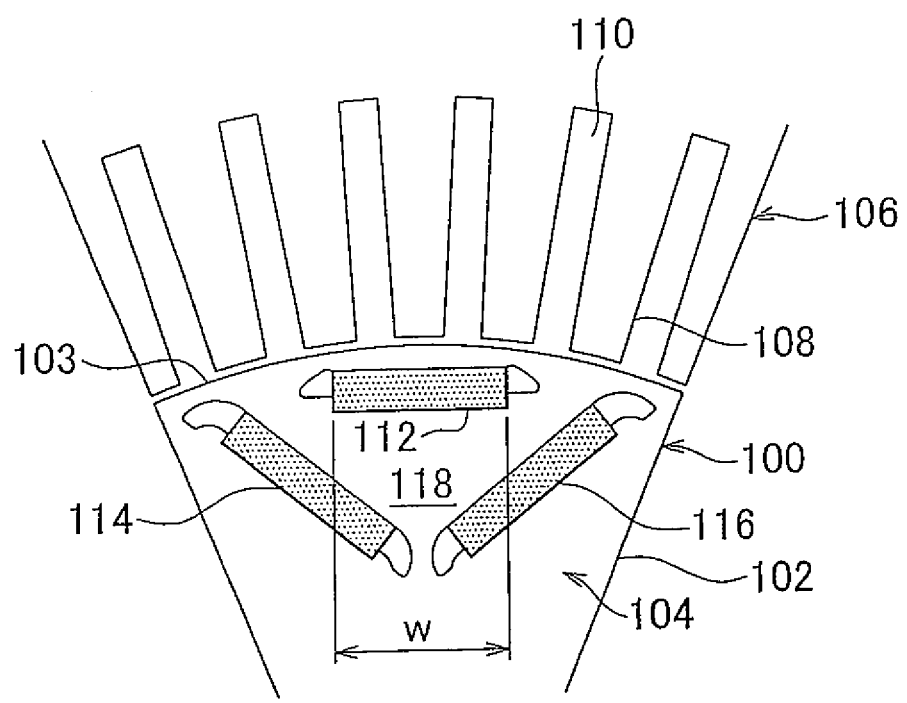
FIG. 8 is a diagram, similar to FIG. 2, illustrating a conventional example, in which one magnetic pole includes three permanent magnets.

FIG. 7 illustrates an example in which a plurality of q-axis magnetic path regions are formed in one magnetic pole 24. In this example, the magnetic pole 24 further has: a pair of third permanent magnets 50, buried on both sides of the pair of second permanent magnets 26, in the circumferential direction, and disposed in such a manner that that the mutual spacing becomes narrower inward in the radial direction; and a second magnetic flux suppression hole 52 formed opposite the first magnetic flux suppression hole 32 across the magnetic path region 54, between the inner periphery-side end portions of the pair of third permanent magnets 50. A second magnetic path region 54 is formed, by the pairs of second and third permanent magnets 28, 50, as well as by the first and second magnetic flux suppression holes 32, 52, on the inner periphery side of the magnetic path region 30 (first magnetic path region). In this case, preferably, the narrowest spacing between the pair of third permanent magnets 50 is set to be equal to or greater than the width between edge portions, outward in the circumferential direction, of the pair of second permanent magnets 28, in a direction perpendicular to the radial direction. Preferably, the shape, size, arrangement and so forth of the first permanent magnet 26, the pair of second permanent magnets 28, and the magnetic flux suppression hole 32 are designed to be more compact than in the case of the above-described rotor 10, in order to minimize widening of the magnetic pole 24 in the circumferential direction. Other features are identical to those of the above-described rotor 10.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A rotor for a rotary electric machine by comprising
   a rotor core including a plurality of magnetic poles provided at intervals, in a circumferential direction of the rotor core, at an outer periphery of the rotor core, each of the magnetic poles having a first permanent magnet buried in the center of the magnetic pole, in the circumferential direction, and a pair of second permanent magnets that are buried on both sides of the first permanent magnet, in the circumferential direction, and that are disposed such that a mutual spacing between the pair of the second permanent magnets becomes narrower inward in a radial direction of the rotor core, wherein
   the narrowest spacing between the pair of second permanent magnets is set to be wider than a width of the first permanent magnet in a direction perpendicular to the radial direction in a magnetic path region that is formed by being surrounded by the first permanent magnet and the pair of second permanent magnets, as viewed along an axial direction of the rotor core, wherein
   each of the magnetic poles has a first magnetic flux suppression hole that is formed at a position opposite the first permanent magnet across the magnetic path region, between inner periphery-side end portions, in the radial direction, of the pair of second permanent magnets, the first permanent magnet, the second permanent magnets and the first magnetic flux suppression hole defining the first magnetic path region;
   in each of the magnetic poles, a second magnetic path region is formed on an inner periphery side, in the radial direction, of the first magnetic path region with the first magnetic flux suppression hole interposed between the first magnetic path region and the second magnetic path region;
   each of the magnetic poles further has a pair of third permanent magnets buried on both sides of the pair of second permanent magnets in the circumferential direction, and disposed such that a mutual spacing between the pair of third permanent magnets becomes narrower inward in the radial direction, and a second magnetic flux suppression hole formed opposite the first magnetic flux suppression hole across the second magnetic path region, between inner periphery-side end portions in the radial direction, of the pair of third permanent magnets;
   the second magnetic path region is defined by the second and third permanent magnets as well as the first and second magnetic flux suppression holes, on an inner periphery side, in the radial direction, of the first magnetic path region; and
   in the second magnetic path region, the narrowest spacing between the pair of third permanent magnets is set to be equal to or greater than a width between edge portions, outward in the circumferential direction, of the pair of second permanent magnets, in a direction perpendicular to the radial direction.

2. The rotor for a rotary electric machine according to claim 1, wherein
   each of the first permanent magnet and the pair of second permanent magnets has a flat shape, and the direction perpendicular to the radial direction is a longitudinal direction of the first permanent magnet.

3. The rotor for a rotary electric machine according to claim 1, wherein
   a cross section, perpendicular to the axial direction of the rotor core, of each of the first permanent magnet and the pair of second permanent magnets, has an elongated rectangular shape.

4. The rotor for a rotary electric machine according to claim 1, wherein
   the first magnetic flux suppression hole has two first holes that communicate with inner periphery-side end portions of second magnet insertion holes into which the pair of second permanent magnets is respectively inserted, and a second hole that is formed between the first holes with bridge portions interposed between the second hole and the first holes; and
   at least one of the first and second holes includes at least one of a void or a resin having lower relative permeability than that of a magnetic material that forms the rotor core.

5. The rotor for a rotary electric machine according to claim 1, wherein
   the second magnetic flux suppression hole has two third holes that communicate with inner periphery-side end portions of third magnet insertion holes into which the pair of third permanent magnets is respectively inserted, and a fourth hole that is formed between the third holes with bridge portions interposed between the fourth hole and the third holes; and
   at least one of the third and fourth holes includes at least one of a void or a resin having lower relative permeability than that of a magnetic material that forms the rotor core.

6. The rotor for a rotary electric machine according to claim 1, wherein
   the first permanent magnet has two permanent magnets that are disposed close to each other forming a substantially V-shape that widens towards an outer periphery in the radial direction.

7. The rotor for a rotary electric machine according to claim 1, wherein
   each of the pair of second permanent magnets has two permanent magnets disposed close to each other so as to form a substantially V-shape that widens towards the first permanent magnet.

8. The rotor for a rotary electric machine according to claim 1, wherein the pair of third permanent magnets have a flat shape.

9. The rotor for a rotary electric machine according to claim 1, wherein a cross section, perpendicular to the axial direction of the rotor core, of each of the pair of third permanent magnets, has an elongated rectangular shape.

10. The rotor for a rotary electric machine according to claim 1, wherein a longitudinal direction of each of the pair of third permanent magnets is disposed substantially along the radial direction.

11. The rotor for a rotary electric machine according to claim 1, wherein
a radial direction position of the first permanent magnet, a position, in the radial direction, of outer periphery-side end portions of the pair of second permanent magnets in the radial direction, and a position, in the radial direction, of outer periphery-side end portions of the pair of third permanent magnets in the radial direction, are substantially identical to one another.

* * * * *

UNITED STATES PATENT AND TRADEMARK OFFICE
CERTIFICATE OF CORRECTION

PATENT NO. : 9,231,445 B2  
APPLICATION NO. : 13/982629  
DATED : January 5, 2016  
INVENTOR(S) : Shinya Sano et al.

Page 1 of 1

It is certified that error appears in the above-identified patent and that said Letters Patent is hereby corrected as shown below:

On The Title Page, Item (54) Title should read:

(54) ROTOR FOR ELECTRIC MACHINE

Signed and Sealed this  
Tenth Day of May, 2016

Michelle K. Lee  
*Director of the United States Patent and Trademark Office*